US008498797B2

(12) United States Patent
Moriya

(10) Patent No.: US 8,498,797 B2
(45) Date of Patent: Jul. 30, 2013

(54) CONTROL APPARATUS AND CONTROL METHOD FOR INTERNAL COMBUSTION ENGINE

(75) Inventor: Yoshihito Moriya, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 909 days.

(21) Appl. No.: 12/395,769

(22) Filed: Mar. 2, 2009

(65) Prior Publication Data

US 2009/0222197 A1 Sep. 3, 2009

(30) Foreign Application Priority Data

Feb. 28, 2008 (JP) ................................ 2008-047410

(51) Int. Cl.

| | |
|---|---|
| ***B60T 7/12*** | (2006.01) |
| ***G05D 1/00*** | (2006.01) |
| ***G06F 7/00*** | (2006.01) |
| ***G06F 17/00*** | (2006.01) |
| ***F01L 1/34*** | (2006.01) |
| ***F02D 13/06*** | (2006.01) |
| ***F02D 17/02*** | (2006.01) |
| ***F02D 7/00*** | (2006.01) |

(52) U.S. Cl.

USPC .................... 701/103; 123/90.15; 123/198 F; 123/481

(58) Field of Classification Search

USPC ............. 123/198 F, 481, 90.12, 90.15, 90.16, 123/90.17, 90.55; 701/105, 103, 110

See application file for complete search history.

(56) References Cited

U.S. PATENT DOCUMENTS

| | | | | |
|---|---|---|---|---|
| 6,094,974 | A * | 8/2000 | Yamagishi et al. | 73/114.79 |
| 6,311,667 | B1 * | 11/2001 | Satou et al. | 123/295 |
| 6,325,029 | B1 * | 12/2001 | Takahashi | 123/90.15 |
| 6,619,249 | B2 | 9/2003 | Sakuragi et al. | |

(Continued)

FOREIGN PATENT DOCUMENTS

| | | |
|---|---|---|
| JP | 2004340018 | 5/1964 |
| JP | 06081678 A | 3/1994 |

(Continued)

OTHER PUBLICATIONS

Notice of Allowance issued by the United States Patent and Trademark Office on Feb. 20, 2013 to divisional application U.S. Appl. No. 13/421,138 (filing date Mar. 15, 2012).

*Primary Examiner* — Stephen K Cronin
*Assistant Examiner* — Sizo Vilakazi
(74) *Attorney, Agent, or Firm* — Gifford, Krass, Sprinkle, Anderson & Citkowski, P.C.

(57) ABSTRACT

A control apparatus for an internal combustion engine is employed for a multi-cylinder internal combustion engine. The control apparatus includes a variable valve operating mechanism which changes a valve characteristic of an engine valve; a valve stop mechanism which stops opening/closing of the engine valve in at least one cylinder; and a controller which executes a variable valve control that makes an actual value of the valve characteristic match a target value by executing a hydraulic pressure control for the variable valve operating mechanism, and which operates the valve stop mechanism so that a reduced-cylinder operation is performed when an engine operating state is in a preset reduced-cylinder operation region. If it is determined that a pressure of hydraulic fluid supplied to the variable valve operating mechanism satisfies a preset condition when the engine operating state is in the reduced-cylinder operation region, the controller prohibits the variable valve control.

5 Claims, 7 Drawing Sheets

U.S. PATENT DOCUMENTS

| | | | | |
|---|---|---|---|---|
| 6,688,275 | B2 | 2/2004 | Shindou et al. | |
| 6,691,652 | B2 * | 2/2004 | Kammerdiener et al. | 123/90.12 |
| 2007/0084425 | A1 * | 4/2007 | Hirose et al. | 123/90.1 |
| 2009/0105896 | A1 * | 4/2009 | Tamai et al. | 701/22 |

FOREIGN PATENT DOCUMENTS

| | | | |
|---|---|---|---|
| JP | 06317125 | A | 11/1994 |
| JP | 10141036 | | 5/1998 |
| JP | 2001164953 | | 6/2001 |
| JP | 2002221052 | A | 8/2002 |
| JP | 2002227665 | | 8/2002 |
| JP | 2004300922 | | 10/2004 |
| JP | 2004346903 | A | 12/2004 |
| JP | 05163971 | | 6/2005 |
| JP | 2007113398 | A | 5/2007 |

* cited by examiner

CONTROL APPARATUS AND CONTROL METHOD FOR INTERNAL COMBUSTION ENGINE

INCORPORATION BY REFERENCE

The disclosure of Japanese Patent Application No. 2008-047410 filed on Feb. 28, 2008 including the specification, drawings and abstract is incorporated herein by reference in its entirety.

BACKGROUND OF THE INVENTION

1. Field of the Invention

The invention relates to a control apparatus and a control method for an internal combustion engine.

2. Description of the Related Art

For example, Japanese Patent Application Publication No. 5-163971 (JP-A-5-163971) describes a multi-cylinder internal combustion engine that includes a variable valve operating mechanism and a valve stop mechanism. The variable valve operating mechanism changes the valve characteristic of an engine valve, for example, an intake valve and/or an exhaust valve. The valve stop mechanism stops the opening and closing of the engine valve in at least one of cylinders.

In the internal combustion engine, an output from the engine is improved, and properties of exhaust gas are improved by variably controlling the valve characteristic of the engine valve using the variable valve operating mechanism. Also, for example, fuel efficiency is improved by performing a so-called reduced-cylinder operation. In the reduced-cylinder operation, the opening and closing of the engine valve (for example, the intake valve) in at least one of the cylinders is stopped using the valve stop mechanism, and thus, the at least one cylinder is deactivated.

In the case where a hydraulically-actuated variable valve operating mechanism is employed as the variable valve operating mechanism, a variable valve control that makes an actual value of a valve characteristic match a target value of the valve characteristic is executed by controlling a pressure of hydraulic fluid supplied to the variable valve operating mechanism. The variable valve control is executed taking into account cam torque acting on the variable valve operating mechanism due to a reaction force of a valve spring for the engine valve.

As described above, in the internal combustion engine in which at least one of the cylinders can be deactivated by stopping the opening and closing of the engine valve in the at least one cylinder, that is, in the internal combustion engine in which the so-called reduced-cylinder operation can be performed, when an all-cylinder operation is performed, all the engine valves are opened and closed, and thus all the valve springs generate the reaction force. On the other hand, when the reduced-cylinder operation is performed, the opening and closing of at least one engine valve are stopped, and thus, the reaction force generated by the valve springs is decreased according to the number of the engine valves whose opening and closing are stopped.

Thus, when the all-cylinder operation is performed, the reaction force generated by the valve springs is different from that when the reduced-cylinder operation is performed. Thus, when the all-cylinder operation is performed, for example, the average value of the cam torque acting on the variable valve operating mechanism is different from that when the reduced-cylinder operation is performed. Therefore, in the internal combustion engine in which the operation is changed between the all-cylinder operation and the reduced-cylinder operation, the valve characteristic, which is variably controlled, may become unstable.

SUMMARY OF THE INVENTION

The invention provides a control apparatus and a control method for an internal combustion engine, which reduce the possibility that a valve characteristic, which is variably controlled, becomes unstable, in a multi-cylinder internal combustion engine in which an all-cylinder operation and a reduced-cylinder operation are performed.

A first aspect of the invention relates to a control apparatus for an internal combustion engine, which is employed for a multi-cylinder internal combustion engine. The control apparatus includes a hydraulically-actuated variable valve operating mechanism which is provided in the multi-cylinder internal combustion engine, and which changes a valve characteristic of an engine valve; a valve stop mechanism which is provided in the multi-cylinder internal combustion engine, and which stops opening and closing of the engine valve in at least one of cylinders; and a controller which executes a variable valve control that makes an actual value of the valve characteristic match a target value of the valve characteristic by executing a hydraulic pressure control for the variable valve operating mechanism, and which operates the valve stop mechanism so that a reduced-cylinder operation is performed when an engine operating state is in a preset reduced-cylinder operation region, wherein if it is determined that a pressure of hydraulic fluid supplied to the variable valve operating mechanism satisfies a preset condition when the engine operating state is in the reduced-cylinder operation region, the controller prohibits the variable valve control.

When executing the variable valve control that makes the actual value of the valve characteristic match the target value of the valve characteristic, the response of the variable valve operating mechanism is changed according to the pressure of the hydraulic fluid supplied to the variable valve operating mechanism. As described above, when the all-cylinder operation is performed, the reaction force generated by the valve springs is different from that when the reduced-cylinder operation is performed. Therefore, when the all-cylinder operation is performed, for example, the average value of the cam torque acting on the variable valve operating mechanism is different from that when the reduced-cylinder operation is performed. For example, when the reduced-cylinder operation is performed, the average value of the cam torque is smaller than that when the all-cylinder operation is performed. Accordingly, when the reduced-cylinder operation is performed, the valve characteristic is changed to a large degree with respect to a change in the pressure of the hydraulic fluid. Thus, when the reduced-cylinder operation is performed, it is necessary to more precisely execute the hydraulic pressure control. If the pressure of the hydraulic fluid is decreased during the reduced-cylinder operation, the response of the variable valve operating mechanism is decreased. This makes it difficult to precisely execute the hydraulic pressure control. Therefore, for example, when the actual value of the valve characteristic is maintained at the target value, for example, a hunting phenomenon, in which the actual value of the valve characteristic oscillates, is likely to occur. As a result, the valve characteristic, which is variably controlled, may be unstable.

Thus, in the configuration, if it is determined that the pressure of the hydraulic fluid supplied to the variable valve operating mechanism satisfies the preset condition when the engine operating state is in the reduced-cylinder operation region, the variable valve control is prohibited. Thus, in the case where the reduced-cylinder operation is performed, and accordingly, the precise hydraulic pressure control is required, when the pressure of the hydraulic fluid satisfies the preset condition, and therefore, the response of the variable valve operating mechanism may be decreased, the valve timing control is prohibited. Accordingly, it is possible to appropriately reduce the possibility that the valve timing of the engine valve, which is variably controlled, becomes unstable during the reduced-cylinder operation, in the multi-cylinder engine in which the all-cylinder operation and the reduced-cylinder operation are performed.

In the above-described aspect, when the variable valve control is prohibited, the variable valve control may be prohibited after the valve characteristic is fixed to a predetermined characteristic.

If the variable valve control is immediately prohibited, and the operation of the variable valve operating mechanism is stopped at the time point at which the pressure of the hydraulic fluid satisfies the preset condition, the movable portion of the variable valve operating mechanism may be moved due to an external force such as the cam torque, and the valve characteristic may be changed. However, in the configuration, when the variable valve control is prohibited, the variable valve control is prohibited after the valve characteristic is fixed to a predetermined characteristic. Accordingly, it is possible to reduce the possibility that the valve characteristic is changed when the variable valve control is prohibited. In most cases, the reduced-cylinder operation is performed when the engine operating state is in a low-load region and thus, the combustion of the air-fuel mixture is likely to deteriorate. Therefore, in the configuration, the valve characteristic may be fixed so that the combustion of the air-fuel mixture is stabilized. For example, when the valve timing of the intake valve is changed using the variable valve operating mechanism, the valve timing of the intake valve may be fixed at the most retarded position. Also, when the valve timing of the exhaust valve is changed using the variable valve operating mechanism, the valve timing of the exhaust valve may be fixed at the most advanced position. Thus, it is possible to reduce the amount of exhaust gas recirculated by internal EGR (internal EGR gas) when the valve characteristic is fixed. Therefore, it is possible suppress the deterioration of the combustion when the valve characteristic is fixed.

In the above-described aspect, when the valve characteristic is fixed to the predetermined characteristic, a valve timing of the engine valve may be fixed at a most retarded position.

When the variable valve control is prohibited and the operation of the variable valve operating mechanism is stopped, the movable portion of the variable valve operating mechanism is moved in a direction in which the cam torque acts, more specifically, the movable portion of the variable valve operating mechanism is moved in the direction so that the valve timing is retarded. Accordingly, as described above, when the valve characteristic is fixed to the predetermined characteristic, the valve timing of the engine valve is fixed at the most retarded position. Therefore, it is possible to fix the valve characteristic using the cam torque. When the valve characteristic is fixed to the predetermined characteristic, the movable portion of the variable valve operating mechanism may be fixed using, for example, a locking mechanism. In the configuration, by fixing the valve timing of the engine valve at the most retarded position, it is possible to more easily fix the valve characteristic.

A second aspect of the invention relates to a control apparatus for an internal combustion engine, which is employed for a multi-cylinder internal combustion engine. The control apparatus includes a hydraulically-actuated variable valve operating mechanism which is provided in the multi-cylinder internal combustion engine, and which changes a valve characteristic of an engine valve; a valve stop mechanism which is provided in the multi-cylinder internal combustion engine, and which stops opening and closing of the engine valve in at least one of cylinders; and a controller which executes a variable valve control that makes an actual value of the valve characteristic match a target value of the valve characteristic by executing a hydraulic pressure control for the variable valve operating mechanism, and which operates the valve stop mechanism so that a reduced-cylinder operation is performed when an engine operating state is in a preset reduced-cylinder operation region, wherein if it is determined that a pressure of hydraulic fluid supplied to the variable valve operating mechanism satisfies a preset condition when the engine operating state is in the reduced-cylinder operation region, the controller prohibits the reduced-cylinder operation.

When executing the variable valve control that makes the actual value of the valve characteristic match the target value of the valve characteristic, the response of the variable valve operating mechanism is changed according to the pressure of the hydraulic fluid supplied to the variable valve operating mechanism. As described above, when the all-cylinder operation is performed, the reaction force generated by the valve springs is different from that when the reduced-cylinder operation is performed. Therefore, when the all-cylinder operation is performed, for example, the average value of the cam torque acting on the variable valve operating mechanism is different from that when the reduced-cylinder operation is performed. For example, when the reduced-cylinder operation is performed, the average value of the cam torque is smaller than that when the all-cylinder operation is performed. Accordingly, when the reduced-cylinder operation is performed, the valve characteristic is changed to a large degree with respect to a change in the pressure of the hydraulic fluid. Thus, when the reduced-cylinder operation is performed, it is necessary to more precisely execute the hydraulic pressure control. If the pressure of the hydraulic fluid is decreased during the reduced-cylinder operation, the response of the variable valve operating mechanism is decreased. This makes it difficult to precisely execute the hydraulic pressure control. Therefore, for example, when the actual value of the valve characteristic is maintained at the target value, for example, a hunting phenomenon, in which the actual value of the valve characteristic oscillates, is likely to occur. As a result, the valve characteristic, which is variably controlled, may be unstable.

Thus, in the configuration, if it is determined that the pressure of the hydraulic fluid supplied to the variable valve operating mechanism satisfies the preset condition when the engine operating state is in the reduced-cylinder operation region, the reduced-cylinder operation is prohibited. Thus, when the pressure of the hydraulic fluid satisfies the preset condition, and therefore, the response of the variable valve operating mechanism is decreased, the reduced-cylinder operation, during which the precise hydraulic pressure control is required, is prohibited. Accordingly, it is possible to reduce the possibility that the valve characteristic, which is variably controlled, is made unstable by performing the reduced-cylinder operation, in the engine in which the all-cylinder operation and the reduced-cylinder operation are performed.

In the above-described aspects, the preset condition may be a condition that the pressure of the hydraulic fluid is equal to or lower than a preset determination pressure.

With the configuration, it is possible to appropriately determine whether the pressure of the hydraulic fluid is equal to or lower than the preset determination pressure, that is, whether the response of the variable valve operating mechanism may be decreased.

In the above-described aspects, the determination pressure may be variably set so that the determination pressure is increased as a temperature of the hydraulic fluid increases.

As the temperature of the hydraulic fluid increases, the viscosity of the hydraulic fluid decreases, and therefore, the amount of the hydraulic fluid that leaks in the variable valve operating mechanism increases. Accordingly, when the leak amount increases, even if the pressure of the hydraulic fluid is high to some extent, the amount of the hydraulic fluid used to drive the variable valve operating mechanism decreases, and as a result, the response of the variable valve operating mechanism is decreased. In this regard, in the configuration, the determination pressure is variably set so that the determination pressure is increased as the temperature of the hydraulic fluid increases. Therefore, as the response of the variable valve operating mechanism is more likely to be decreased due to an increase in the temperature of the hydraulic fluid, the condition is more likely to be satisfied. Accordingly, it is possible to appropriately determine whether the response of the variable valve operating mechanism may be decreased due to an increase in the temperature of the hydraulic fluid.

In the above-described aspects, the determination pressure may be variably set so that the determination pressure is increased as an engine speed decreases.

As the engine speed decreases, the rotational speed of the camshaft decreases, and the cycle of change of the cam torque increases. Therefore, as the engine speed decreases, the cam torque tends to change more distinctly, and the valve timing tends to be made more unstable. In this regard, in the configuration, the determination pressure is variably set so that the determination pressure is increased as the engine speed decreases. Therefore, as the valve characteristic is more likely to be made unstable, the condition is more likely to be satisfied. Accordingly, when the valve characteristic is likely to be made unstable by a decrease in the engine speed, it is possible to reduce the possibility that the valve timing is made even more unstable by a decrease in the response of the variable valve operating mechanism.

The pressure of the hydraulic fluid supplied to the variable valve operating mechanism may be directly detected using, for example, a pressure sensor. In addition, because as the temperature of the hydraulic fluid increases, the pressure of the hydraulic fluid tends to decrease due to a decrease in the viscosity, the pressure of the hydraulic fluid may be estimated based on the temperature of the hydraulic fluid. Also, because as the temperature of the hydraulic fluid increases, the pressure of the hydraulic fluid decreases, a condition that the temperature of the hydraulic fluid is equal to or higher than a predetermined determination temperature may be set as a condition for prohibiting the variable valve control, or a condition for prohibiting the reduced-cylinder operation. In this case as well, it is possible to determine whether the response of the variable valve operating mechanism may be decreased due to a decrease in the pressure of the hydraulic fluid. In addition to directly detecting the temperature of the hydraulic fluid using, for example, a temperature sensor, the temperature of the hydraulic fluid may be estimated based on the engine operating state, the temperature of the coolant of the engine, or an elapsed time after the engine is started.

When the oil pump for the hydraulic fluid is driven by the crankshaft of the engine, as the engine speed decreases, the amount of the hydraulic fluid delivered by the oil pump decreases, and therefore, the pressure of the hydraulic fluid decreases. Accordingly, the pressure of the hydraulic fluid may be estimated based on the engine speed. Also, because as the engine speed decreases, the pressure of the hydraulic fluid decreases, a condition that the engine speed is equal to or lower than a predetermined speed is set as a condition for prohibiting the variable valve control or a condition for prohibiting the reduced-cylinder operation. In this case as well, it is possible to determine whether the response of the variable valve operating mechanism may be decreased due to a decrease in the pressure of the hydraulic fluid.

A third aspect of the invention relates to a control method for an internal combustion engine, which is employed for a multi-cylinder internal combustion engine including a hydraulically-actuated variable valve operating mechanism that changes a valve characteristic of an engine valve, and a valve stop mechanism that stops opening and closing of the engine valve in at least one of cylinders. In the control method, a variable valve control that makes an actual value of the valve characteristic match a target value of the valve characteristic is executed by executing a hydraulic pressure control for the variable valve operating mechanism; and when an engine operating state is in a preset reduced-cylinder operation region, the valve stop mechanism is operated so that a reduced-cylinder operation is performed. The control method includes determining whether the engine operating state is in the reduced-cylinder operation region; determining whether a pressure of hydraulic fluid supplied to the variable valve operating mechanism satisfies a preset condition, if it is determined that the engine operating state is in the reduced-cylinder operation region; and prohibiting the variable valve control, if it is determined that the pressure of the hydraulic fluid satisfies the preset condition.

A fourth aspect of the invention relates to a control method for an internal combustion engine, which is employed for a multi-cylinder internal combustion engine including a hydraulically-actuated variable valve operating mechanism that changes a valve characteristic of an engine valve, and a valve stop mechanism that stops opening and closing of the engine valve in at least one of cylinders. A variable valve control that makes an actual value of the valve characteristic match a target value of the valve characteristic is executed by executing a hydraulic pressure control for the variable valve operating mechanism; and when an engine operating state is in a preset reduced-cylinder operation region, the valve stop mechanism is operated so that a reduced-cylinder operation is performed. The control method includes determining whether the engine operating state is in the reduced-cylinder operation region; determining whether a pressure of hydraulic fluid supplied to the variable valve operating mechanism satisfies a preset condition, if it is determined that the engine operating state is in the reduced-cylinder operation region; and prohibiting the reduced-cylinder operation, if it is determined that the pressure of the hydraulic fluid satisfies the preset condition.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

[First embodiment] Hereinafter, a control apparatus for an internal combustion engine according to a first embodiment of the invention will be described with reference to FIG. 1 to FIG. 5.

Figure 1:
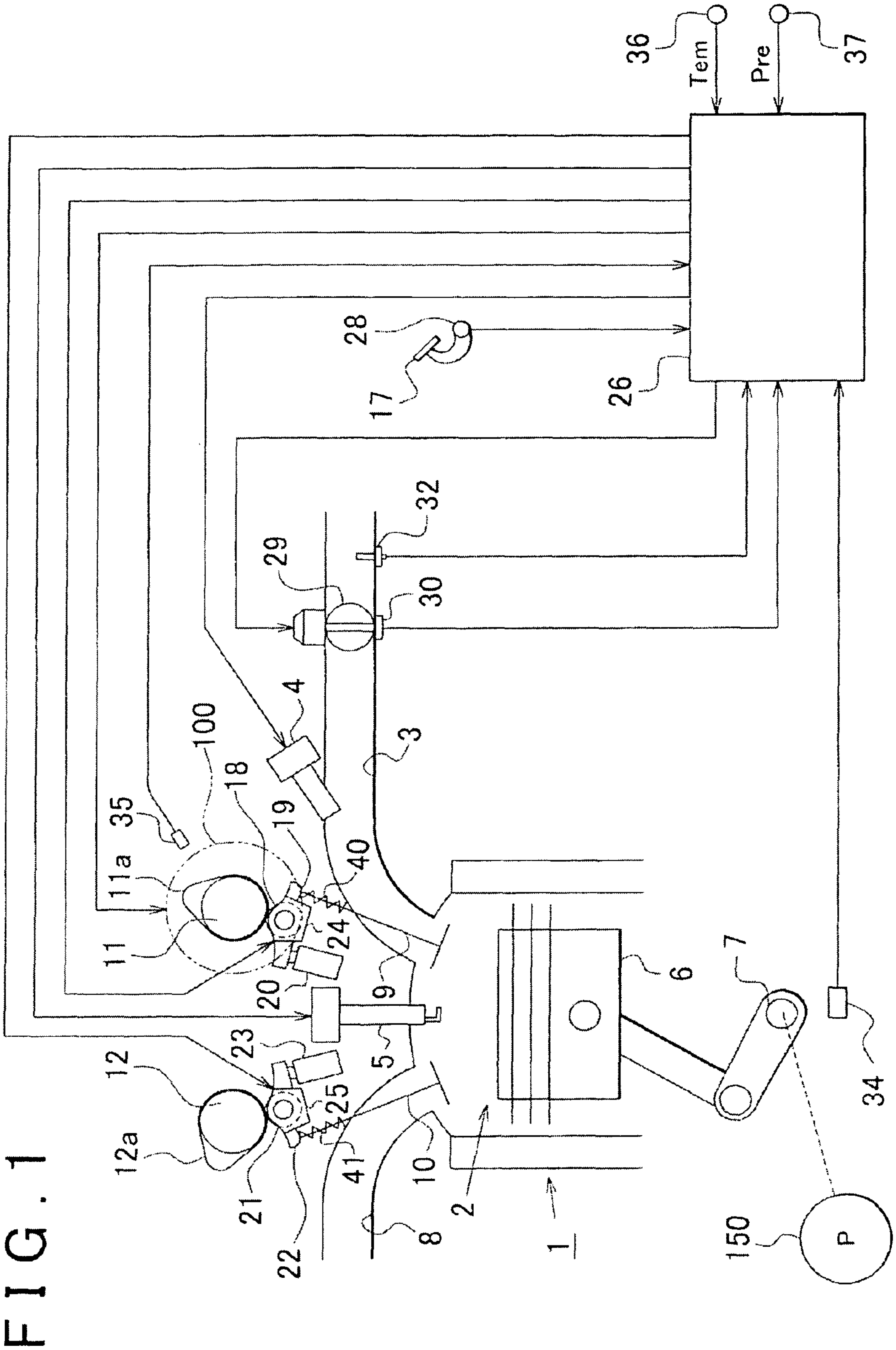
FIG. 1 is a schematic diagram showing an internal combustion engine to which a control apparatus for an internal combustion engine according to a first embodiment of the invention is applied, and a configuration around the internal combustion engine.

An engine 1 shown in FIG. 1 is a multi-cylinder internal combustion engine that includes a plurality of cylinders. In the engine 1, the opening amount of a throttle valve 29 provided in an intake passage 3 is adjusted based on, for example, the depression amount of an accelerator pedal 17 (i.e., an accelerator-pedal operation amount). Thus, air, whose amount is determined according to the opening amount of the throttle valve 29, is taken into a combustion chamber 2 of each cylinder through an intake passage 3. The fuel, whose amount is determined according to the amount of air taken into the engine 1, is injected from a fuel injection valve 4 to the intake passage 3 of the engine 1. As a result, an air-fuel mixture, which includes air and fuel, is generated in the combustion chamber 2 of each cylinder in the engine 1. When an ignition plug 5 ignites the air-fuel mixture, the air-fuel mixture is burned. As a result, a piston 6 is reciprocated, and accordingly, a crankshaft 7, which is an output shaft of the engine 1, is rotated. After the air-fuel mixture is burned, exhaust gas is discharged from each combustion chamber 2 to an exhaust passage 8.

In each cylinder of the engine 1, an intake valve 9 is opened and closed to allow and interrupt communication between the combustion chamber 2 and the intake passage 3, and an exhaust valve 10 is opened and closed to allow and interrupt communication between the combustion chamber 2 and the exhaust passage 8. The intake valve 9 and the exhaust valve 10 are opened and closed due to the rotation of an intake camshaft 11 and an exhaust camshaft 12, to which the rotation of the crankshaft 7 is transmitted. More specifically, an intake-side valve spring 40 urges the intake valve 9 in a direction to close the intake valve 9. A rocker arm 19, which includes a roller 18, is provided between an intake cam 11*a* fixed to the intake camshaft 11, and the intake valve 9. When the rotating intake cam 11*a* presses the roller 18, the rocker arm 19 oscillates around a contact point at which the rocker arm 19 contacts a lash adjuster 20. The rocker arm 19 supports one end of the lash adjuster 20. Accordingly, the rocker arm 19 presses the intake valve 9 against a reaction force of the intake-side valve spring 40. Thus, the intake valve 9 is opened and closed by the pressing force of the rocker arm 19 and the reaction force of the intake-side valve spring 40. An exhaust-side valve spring 41 urges the exhaust valve 10 in a direction to close the exhaust valve 10. A rocker arm 22, which includes a roller 21, is provided between an exhaust cam 12*a* fixed to the exhaust camshaft 12, and the exhaust valve 10. When the rotating exhaust cam 12*a* presses the rocker arm 22, the rocker arm 22 oscillates around a contact point at which the rocker arm 22 contacts a lash adjuster 23. The rocker arm 22 supports one end of the lash adjuster 23. Accordingly, the rocker arm 22 presses the exhaust valve 10 against the reaction force of the exhaust-side valve spring 41. Thus, the exhaust valve 10 is opened and closed by the pressing force of the rocker arm 22 and the reaction force of the exhaust-side valve spring 41.

In the above-described engine 1, an all-cylinder operation and a so-called reduced-cylinder operation are performed. In the all-cylinder operation, all of the cylinders are operated. In the reduced-cylinder operation, at least one of the cylinders is deactivated, and only the rest of the cylinders are operated, for example, to improve fuel efficiency. The reduced-cylinder operation is performed by stopping fuel injection from the fuel injection valve 4, stopping the supply of electric power to the ignition plug 5 for igniting the air-fuel mixture, and stopping the opening and closing of the intake valve 9 and the exhaust valve 10, in at least one of the cylinders in the engine 1. The opening and closing of the intake valve 9 and the exhaust valve 10 are stopped using valve stop mechanisms 24 and 25 provided in the rocker arms 19 and 22, respectively.

The valve stop mechanism 24, which is provided in the rocker arm 19 provided between the intake cam 11*a* and the intake valve 9, is able to stop the lift movement (opening/closing) of the intake valve 9 that is opened and closed when the intake cam 11*a* presses the rocker arm 19 (the roller 18).

When the valve stop mechanism 24 is operated, the roller 18 is movable relative to the rocker arm 19 in the direction in which the intake cam 11*a* presses the roller 18. When the valve stop mechanism 24 is not operated, the roller 18 is restricted from moving relative to the rocker arm 19. In the case where the valve stop mechanism 24 is not operated, because the roller 18 is restricted from moving relative to the rocker arm 19, when the intake cam 11*a* presses the roller 18, the rocker arm 19 accordingly oscillates as described above, and thus, the intake valve 9 is opened and closed. In contrast, in the case where the valve stop mechanism 24 is operated, because the roller 18 is movable relative to the rocker arm 19, when the intake cam 11*a* presses the roller 18, the roller 18 moves relative to the rocker arm 19. Thus, although the intake cam 11*a* presses the roller 18, the rocker arm 19 does not oscillate. As a result, the oscillation of the rocker arm 19 is stopped, and accordingly, the lift movement of the intake valve 9 due to the rotation of the intake cam 11*a* is stopped. Thus, the intake valve 9 is brought to a closed state.

The valve stop mechanism 25, which is provided in the rocker arm 22 provided between the exhaust cam 12*a* and the exhaust valve 10, is able to stop the lift movement (opening/closing) of the exhaust valve 10 that is opened and closed when the exhaust cam 12*a* presses the rocker arm 22 (the roller 21).

The valve stop mechanism 25 has the same structure as that of the valve stop mechanism 24. When the valve stop mechanism 25 is operated, the roller 21 is movable relative to the rocker arm 22 in a direction in which the exhaust cam 12*a* presses the roller 21. When the valve stop mechanism 25 is not operated, the roller 21 is restricted from moving relative to the rocker arm 22. In the case where the valve stop mechanism 25 is not operated, because the roller 21 is restricted from moving relative to the rocker arm 22, when the exhaust cam 12*a* presses the roller 21, the rocker arm 22 accordingly oscillates as described above, and thus, the exhaust valve 10 is opened and closed. In contrast, in the case where the valve stop mechanism 25 is operated, because the roller 21 is movable relative to the rocker arm 22, when the exhaust cam 12*a* presses the roller 21, the roller 21 moves relative to the rocker arm 22. Thus, although the exhaust cam 12*a* presses the roller 21, the rocker arm 22 does not oscillate. As a result, the oscillation of the rocker arm 22 is stopped, and accordingly, the lift movement of the exhaust valve 10 due to the rotation of the exhaust cam 12*a* is stopped. Thus, the exhaust valve 10 is also brought to a closed state.

The engine 1 is provided with a hydraulically-actuated variable valve operating mechanism 100 that continuously changes the valve characteristics of the intake valve 9, which is one of engine valves such as the intake valve 9 and the exhaust valve 10. The variable valve operating mechanism 100 changes the valve timing of the intake valve 9 by changing the rotational phase of the intake camshaft 11 relative to the crankshaft 7. The valve characteristics of the intake valve 9 are changed to appropriate values according to an engine operating state, by advancing or retarding both of an opening timing and a closing timing of the intake valve 9 while a valve-open period, in which the intake valve 9 is open, is maintained at a constant value, through the operation of the variable valve operating mechanism 100.

Figure 2:
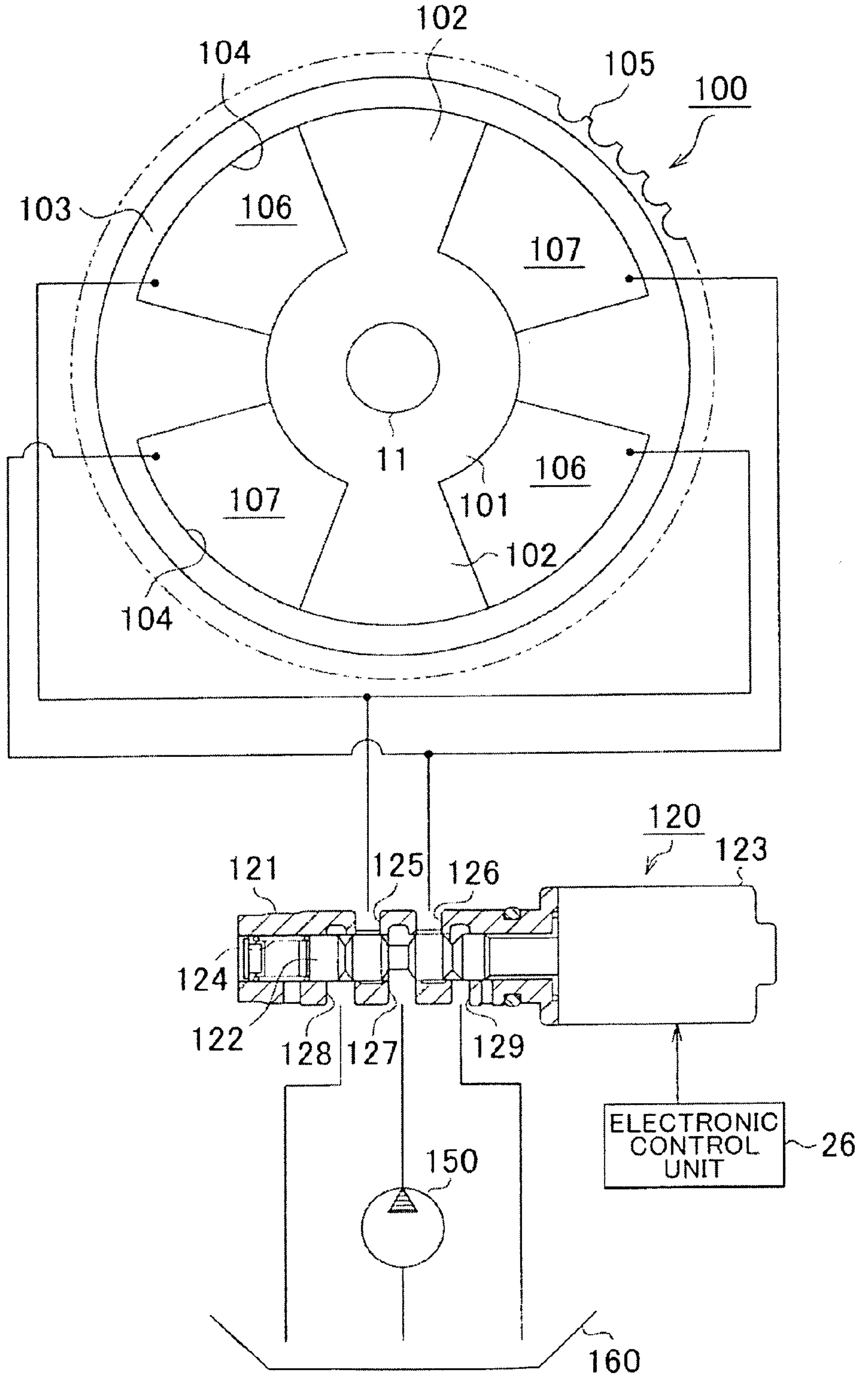
FIG. 2 is a schematic diagram showing the structure of a variable valve operating mechanism according to the first embodiment.

FIG. 2 schematically shows the structure of the variable valve operating mechanism 100. As shown in FIG. 2, the variable valve operating mechanism 100 includes a housing 103 that has substantially circular ring shape, and a rotor 101 housed in the housing 103. The rotor 101 rotates relative to the housing 103. The rotor 101 is connected to the intake camshaft 11 that opens/closes the intake valve 9 in a manner such that the rotor 101 and the intake camshaft 11 rotate integrally with each other. The housing 103 is connected to a cam pulley 105 that is rotated in synchronization with the crankshaft 7 in a manner such that the housing 103 and the cam pulley 105 rotate integrally with each other.

In the housing 103, a plurality of timing-advancing pressure chambers 106 and a plurality of timing-retarding pressure chambers 107 are formed. The timing-advancing pressure chambers 106 and the timing-retarding pressure chamber 107 are defined by the inner peripheral surface of the housing 103, and vanes 102 provided in the rotor 101. The number of the timing-advancing pressure chambers 106 and the number of the timing-retarding pressure chamber 107 may be appropriately changed.

Each of the timing-advancing pressure chambers 106 and the timing-retarding pressure chambers 107 is connected to a hydraulic pressure control valve 120 via an appropriate hydraulic passage. The hydraulic pressure control valve 120 includes a sleeve 121, a spool 122, a solenoid 123, and a spring 124. Ports are formed in the sleeve 121. The spool 122, which serves as a valve element, is housed in the sleeve 121 in a manner such that the spool 122 is reciprocated. The solenoid 123 and the spring 124 reciprocate the spool 122.

A timing-advancing port 125 connected to the timing-advancing pressure chambers 106, a timing-retarding port 126 connected to the timing-retarding chambers 107, and drain ports 128 and 129 connected to the oil pan 160 are formed in the sleeve 121. Also, in the sleeve 121, a pump port 127 is formed. An oil pump 150 is connected to the pump port 127. The oil pump 150 delivers lubricant oil, which is hydraulic fluid, to the variable valve operating mechanism 100. The oil pump 150 is driven by the crankshaft 7. By changing the position of a valve element provided in the spool 122, the hydraulic pressure is supplied to the timing-advancing pressure chambers 106, the hydraulic pressure is supplied to the timing-retarding pressure chambers 107, or the hydraulic pressures in the timing-advancing pressure chambers 106 and the timing-retarding pressure chambers 107 are maintained. The position of the spool 122 is set by the duty factor of a drive voltage signal applied to the solenoid 123.

For example, when the duty factor is equal to or larger than 0% and smaller than 50% (0%≦duty factor<50%), the spool 122 is moved so that communication is provided between the pump port 127 and the timing-retarding port 126, and communication is provided between the drain port 128 and the timing-advancing port 125. Thus, the hydraulic pressure is supplied to the timing-retarding pressure chambers 107, and the rotor 101 is rotated to retard the valve timing. As a result, the valve timing is retarded. When the duty factor is larger than 50% and equal to or smaller than 100% (50%<duty factor≦100%), the spool 122 is moved so that communication is provided between the pump port 127 and the timing-advancing port 125 and communication is provided between the drain port 129 and the timing-retarding port 126. Thus, the hydraulic pressure is supplied to the timing-advancing pressure chambers 106, and the rotor 101 is rotated to advance the valve timing. As a result, the valve timing is advanced. When the duty factor is near 50%, the spool 122 is at a neutral position so that both of the timing-advancing port 125 and the timing-retarding port 126 are closed. Thus, the hydraulic pressures in the timing-advancing pressure chambers 106 and the timing-retarding pressure chambers 107 are maintained. As a result, basically, the current valve timing is maintained.

When the supply of electric power to the solenoid 123 is stopped, the spool 122 moves to a position so that communication is provided between the pump port 127 and the timing-retarding port 126, and communication is provided between the drain port 128 and the timing-advancing port 125, due to the urging force of the spring 124. Accordingly, when the supply of electric power to the solenoid 123 is stopped, the hydraulic pressure is supplied to the timing-retarding chambers 107, and thus, the rotor 101 is maintained at a most retarded position.

Thus, the variable valve operating mechanism 100 includes a movable portion and the hydraulic pressure control valve 120. The movable portion includes the rotor 101, the vanes 102, and the housing 103, and changes the valve characteristics. The hydraulic pressure control valve 120 functions as an actuator that drives the movable portion. When the variable valve operating mechanism 100 changes the valve timing of the intake valve 9, both of the opening timing and the closing timing of the intake valve 9 are advanced by the same crank angle, or retarded by the same crank angle. That is, the opening timing and the closing timing of the intake valve 9 are advanced or retarded while the valve-open period, in which the intake valve 9 is open, is maintained at a constant value.

As shown in FIG. 1, for example, the operating state of the engine 1 is detected using sensors. For example, an accelerator position sensor 28 detects the depression amount of the accelerator pedal 17 depressed by a driver of a vehicle (i.e., the accelerator-pedal operation amount). A throttle position sensor 30 detects the opening amount of the throttle valve 29 provided in the intake passage 3 (i.e., the throttle-valve opening amount). An airflow meter 32 detects the amount of air taken into the combustion chamber 2 through the intake passage 3 (i.e., an intake air amount GA). A crank position sensor 34 detects the rotational angle of the crankshaft 7, that is, a crank angle. An engine speed is calculated based on the signal indicating the detected crank angle. A cam angle sensor 35 provided near the intake camshaft 11 detects the rotational phase of the intake camshaft 11. An actual displacement angle VT of the intake camshaft 11, which indicates the actual valve timing of the intake valve 9, is calculated based on values detected by the cam angle sensor 35 and the crank position sensor 34. Also, a hydraulic fluid temperature sensor 36 detects the temperature of hydraulic fluid supplied to the variable valve operating mechanism 100 (i.e., a hydraulic fluid temperature Tem). A hydraulic pressure sensor 37 detects the pressure of the hydraulic fluid supplied to the variable valve operating mechanism 100 (i.e., a hydraulic pressure Pre).

An electronic control unit 26 executes controls for the engine 1. The electronic control unit 26 includes a CPU, a ROM, a RAM, and input/output ports. The CPU executes calculation processes relating to the above-described controls. Programs and data required to execute the controls are stored in the ROM. The results of the calculations performed by the CPU are temporarily stored in the RAM. Signals are input from the outside to the electronic control unit 26, and signals are output from the electronic control unit 26 to the outside through the input/output ports. Signal lines of the sensors are connected to the input port. For example, drive circuits for the fuel injection valve 4, the ignition plug 5, the hydraulic pressure control valve 120 of the variable valve operating mechanism 100, the throttle valve 29, and the valve stop mechanisms 24 and 25 are connected to the output port. The electronic control unit 26 outputs command signals to the above-described drive circuits connected to the output port, according to the engine operating state detected by the sensors. Thus, the electronic control unit 26 executes a fuel injection control for the fuel injection valve 4, an ignition timing control for the ignition plug 5, a valve timing control for the intake valve 9, an opening amount control for the throttle valve 29, and drive controls for the valve stop mechanisms 24 and 25.

Figure 3:
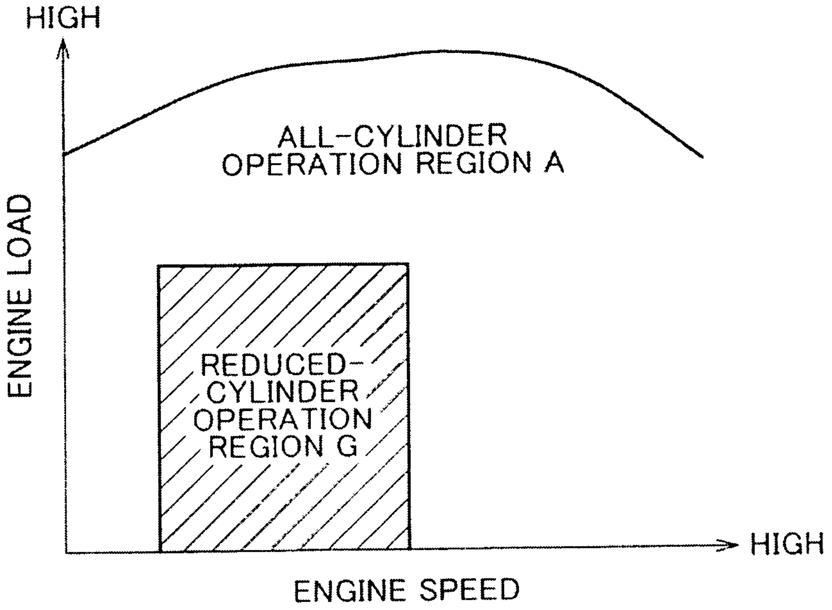
FIG. 3 is a conceptual diagram showing an all-cylinder operation region and a reduced-cylinder operation region according to the first embodiment.

The operation of the engine 1 is changed between the reduced-cylinder operation and the all-cylinder operation, according to the engine operating state. That is, as shown in FIG. 3, when the engine operating state determined based on the engine speed and an engine load is a low-speed low-load state, and the engine operating state is in a preset reduced-cylinder operation region G, the reduced-cylinder operation is performed. If the reduced-cylinder operation is performed when the engine operating state is in an extremely low speed region, torque output from the engine 1 significantly fluctuates. Therefore, in the embodiment, the extremely low speed region is excluded from the reduced-cylinder operation region G.

When the reduced-cylinder operation is performed, the fuel injection from the fuel injection valve 4 is stopped and the ignition performed by the ignition plug 5 is stopped in at least one of the cylinders. In addition, the opening/closing of the intake valve 9 and the opening/closing of the exhaust valve 10 are stopped by the operation of the valve stop mechanisms 24 and 25 in the at least one of the cylinders in which the fuel injection and the ignition are stopped. Thus, when the engine operating state is in the low-speed low-load region, that is, when the amount of air (air-fuel mixture) taken into each operating cylinder in one cycle is decreased, the reduced-cylinder operation is performed so that at least one of the cylinders is deactivated. Accordingly, the amount of air (air-fuel mixture) taken into each of the rest of the cylinders (i.e., each operating cylinder) in one cycle is increased. As a result, the amount of air (air-fuel mixture) taken into each operating cylinder in one cycle when the reduced-cylinder operation is performed is close to the amount of air (air-fuel mixture) taken into each operating cylinder in one cycle when the all-cylinder operation is performed, and the engine is in the high-load operating state. This improves the fuel efficiency of the engine 1 when the engine 1 is in the low-load operating state.

When the engine operating state is in a region outside the reduced-cylinder operation region G, in other words, when the engine operating state is in an all-cylinder operation region A, the all-cylinder operation is performed. When the all-cylinder operation is performed, the fuel is injected from the fuel injection valve 4, and the ignition plug 5 ignites the air-fuel mixture in each of all the cylinders. In addition, the valve stop mechanisms 24 and 25 are deactivated, and thus, all the intake valves 9 and the exhaust valves 10 are opened and closed.

In the valve timing control for the intake valve 9, the above-described actual displacement angle VT is defined as an amount by which the rotational phase of the intake camshaft 11 is advanced from a reference rotational phase at which the rotor 101 of the variable valve operating mechanism 100 is at the most retarded position, and the valve timing is most retarded. The valve timing of the intake valve 9 is changed according to the engine operating state by executing the feedback control of the operation of the hydraulic pressure control valve 120 so that the actual displacement angle VT matches a target displacement angle VTp set based on the engine operating state. Thus, the variable valve control that makes the actual displacement angle VT of the intake valve 9 match the target displacement angle VTp is executed by executing a hydraulic pressure control for the variable valve operating mechanism 100.

The reaction force of the intake-side valve spring 40 is transmitted to the variable valve operating mechanism 100 through the rocker arm 19, the intake cam 11*a*, and the intake camshaft 11. Therefore, cam torque due to the reaction force of the intake-side valve spring 40 acts on the variable valve operating mechanism 100. Accordingly, the valve timing control is executed taking into account the cam torque.

When the valve timing control is executed, the response of the variable valve operating mechanism 100 is changed according to the pressure of the hydraulic fluid supplied to the variable valve operating mechanism 100. When the all-cylinder operation of the engine 1 is performed, all the intake valves 9 and all the exhaust valves 10 are opened and closed. Thus, all the valve springs generate the reaction force. On the other hand, when the reduced-cylinder operation of the engine 1 is performed, the opening and closing of the intake valve 9 and the opening and closing of the exhaust valve 10 are stopped in at least one of the cylinders, and accordingly, the reaction force generated by the valve springs is decreased according to the number of the engine valves whose opening and closing are stopped. Thus, the average value of the cam torque acting on the variable valve operating mechanism 100 during the reduced-cylinder operation is smaller than that during the all-cylinder operation. Accordingly, when the reduced-cylinder operation is performed, the valve timing is changed to a large degree with respect to a change in the pressure of the hydraulic fluid. Thus, when the reduced-cylinder operation is performed, it is necessary to more precisely control the hydraulic pressure to precisely control the valve timing, as compared to when the all-cylinder operation is performed.

If the pressure of the hydraulic fluid is decreased during the reduced-cylinder operation, the response of the variable valve operating mechanism 100 is decreased. This makes it difficult to execute the precise hydraulic pressure control. Therefore, for example, when the actual displacement angle VT is maintained at the target displacement angle VTp, for example, a hunting phenomenon, in which the actual displacement angle VT oscillates, is likely to occur. As a result, the valve timing may be unstable.

In the embodiment, a valve timing control prohibition routine described below is executed to reduce the possibility that the valve timing, which is variably controlled, becomes unstable during the reduced-cylinder operation, in the engine 1 in which the all-cylinder operation and the reduced-cylinder operation are performed.

Figure 4:
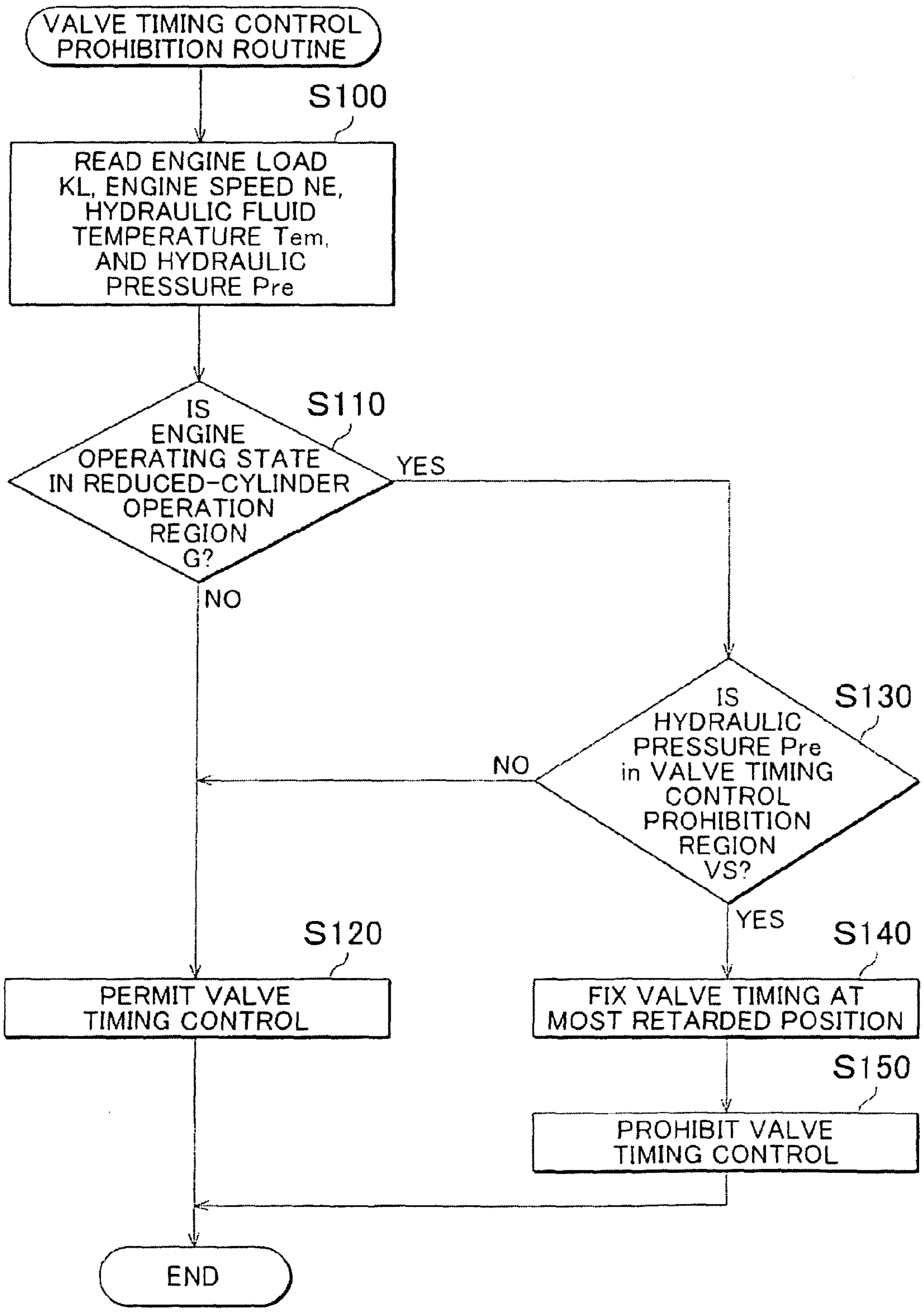
FIG. 4 is a flowchart showing steps of a valve timing control prohibition routine according to the first embodiment.

FIG. 4 shows steps of the valve timing control prohibition routine. The electronic control unit 26 repeatedly executes the routine at predetermined time intervals. When the routine is started, first, an engine load KL, an engine speed NE, the hydraulic fluid temperature Tem, and the hydraulic pressure Pre are read (S100).

Next, it is determined whether the current engine operating state is in the reduced-cylinder operation region G, based on the engine load KL and the engine speed NE (S100). When the engine operating state is not in the reduced-cylinder operation region G, that is, when the engine operating state is in the all-cylinder operation region A (NO in step S110), the valve timing control is permitted (S120), and the routine ends. When the valve timing control is permitted, the hydraulic pressure control for the variable valve operating mechanism 100 is executed so that the actual displacement angle VT matches the target displacement angle VTp set based on the engine operating state.

When the engine operating state is in the reduced-cylinder operation region G (YES in step S110), it is determined whether the current hydraulic pressure Pre is in a valve timing control prohibition region VS (S130). When the current hydraulic pressure Pre is in the valve timing control prohibition region VS, it is determined that the hydraulic pressure Pre satisfies a prohibition condition for prohibiting the valve timing control.

Figure 5:
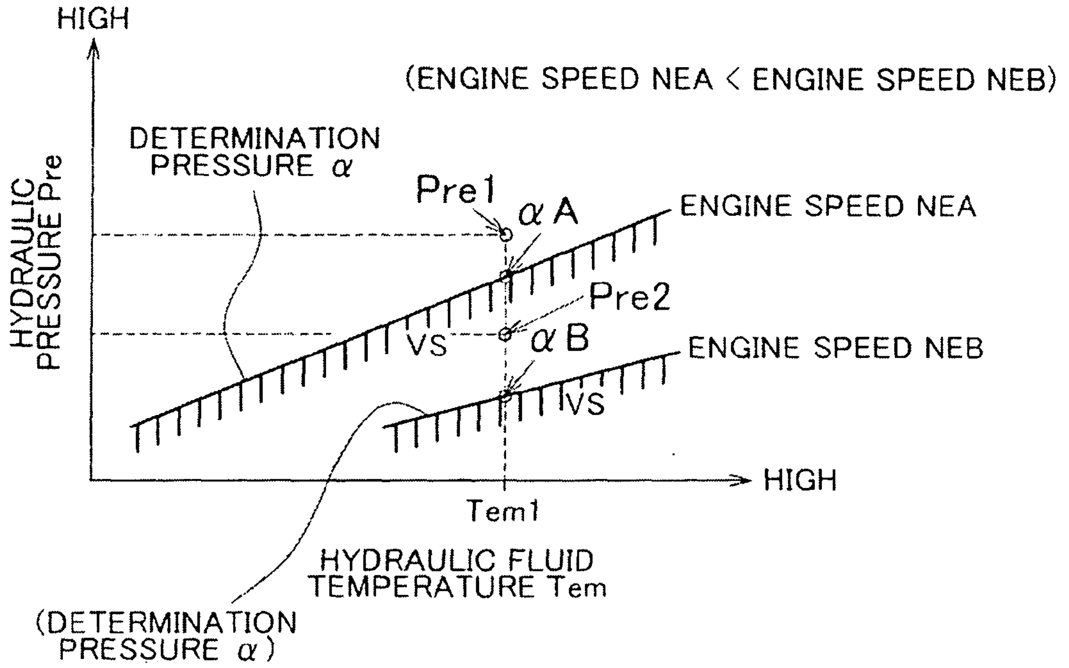
FIG. 5 is a conceptual diagram showing a manner in which a valve timing control prohibition region is set according to the first embodiment.

FIG. 5 shows a manner in which the valve timing control prohibition region VS is set. As shown in FIG. 5, when the hydraulic pressure Pre is equal to or lower than a determination pressure $\alpha$, it is determined that the current hydraulic pressure Pre is in the valve timing control prohibition region VS. Thus, it is determined that the response of the variable valve operating mechanism 100 may be decreased due to the decrease in the hydraulic pressure. Also, the determination pressure $\alpha$ is variably set based on the hydraulic fluid temperature Tem and the engine speed NE. The determination pressure $\alpha$ is variably set for the reason described below.

As the temperature of the hydraulic fluid increases, the viscosity of the hydraulic fluid decreases, and therefore, the amount of the hydraulic fluid that leaks in the variable valve operating mechanism 100 increases. For example, the amount of the hydraulic fluid that leaks from the timing-advancing pressure chambers 106 and the timing-retarding pressure chambers 107 increases. Accordingly, when the leak amount increases, even if the pressure of the hydraulic fluid is high to some extent, the amount of the hydraulic fluid used to rotate the rotor 101 decreases, and as a result, the response of the variable valve operating mechanism 100 is decreased. Thus, as shown in FIG. 5, the determination pressure $\alpha$ is variably set so that the determination pressure $\alpha$ is increased as the hydraulic fluid temperature Tem of the hydraulic fluid increases. Thus, when the hydraulic pressure Pre remains the same, as the response of the variable valve operating mechanism 100 is more likely to be decreased due to an increase in the temperature of the hydraulic fluid, the above-described prohibition condition that the hydraulic pressure Pre is equal to or lower than the determination pressure $\alpha$ (the hydraulic pressure Pre$\leqq$the determination pressure $\alpha$) is more likely to be satisfied. Accordingly, it is possible to appropriately determine whether the response of the variable valve operating mechanism 100 may be decreased due to an increase in the temperature of the hydraulic fluid.

Also, as the engine speed NE decreases, the rotational speed of the intake camshaft 11 decreases, and the cycle of change of the cam torque increases. Therefore, as the engine speed NE decreases, the cam torque tends to change more distinctly, and the valve timing tends to be made more unstable. Accordingly, as shown in FIG. 5, the determination pressure $\alpha$ is variably set so that the determination pressure $\alpha$ is increased as the engine speed NE decreases. Thus, as the valve characteristics are more likely to be made unstable, the above-described prohibition condition that the hydraulic pressure Pre is equal to or lower than the determination pressure $\alpha$ (the hydraulic pressure Pre$\leqq$the determination pressure $\alpha$) is more likely to be satisfied. Accordingly, when the valve timing is likely to be made unstable by a decrease in the engine speed NE, it is possible to reduce the possibility that the valve timing is made even more unstable by a decrease in the response of the variable valve operating mechanism 100.

An example of a manner, in which it is determined whether the hydraulic pressure Pre is in the valve timing control prohibition region VS, will be described with reference to FIG. 5. For example, when the current engine speed NE is an engine speed NEA (for example, approximately 1000 r/min), and the hydraulic fluid temperature Tem is a hydraulic fluid temperature Tem1, the determination pressure $\alpha$ is set to a determination pressure $\alpha$A corresponding to the engine speed NEA and the hydraulic fluid temperature Tem1. When a current hydraulic pressure Pre1 is higher than the determination pressure $\alpha$A, it is determined that the hydraulic pressure Pre is not in the valve timing control prohibition region VS. When a current hydraulic pressure Pre2 is equal to or lower than the determination pressure $\alpha$A, it is determined that the hydraulic pressure Pre is in the valve timing control prohibition region VS.

When the current engine speed NE is an engine speed NEB (for example, approximately 2000 r/min) that is higher than the engine speed NEA, and the hydraulic fluid temperature Tem is the hydraulic fluid temperature Tem1, the determination pressure $\alpha$ is set to a determination pressure $\alpha$B corresponding to the engine speed NEB and the hydraulic fluid temperature Tem1. Also, as in the above-described manner, when the current hydraulic pressure Pre is higher than the determination pressure $\alpha$B, it is determined that the hydraulic pressure Pre is not in the valve timing control prohibition region VS. When it is determined that the current hydraulic pressure Pre is equal to or lower than the determination pressure $\alpha$B, it is determined that the hydraulic pressure Pre is in the valve timing control prohibition region VS.

When it is determined that the hydraulic pressure Pre is not in the valve timing control prohibition region VS in step S130 (NO in step S130), it is determined that the valve timing is not made unstable, and the valve timing control is permitted (S120). Then, the routine ends.

When it is determined that the hydraulic pressure Pre is in the valve timing control prohibition region VS in step S130 (YES in step S130), it is determined that the valve timing may be made unstable. Thus, first, the valve timing of the intake valve 9 is fixed at the most retarded position (S140). In step 140, the supply of electric power to the solenoid 123 is substantially stopped by setting the duty factor of the drive voltage signal applied to the solenoid 123 to "0%". Thus, the hydraulic pressure is supplied to the timing-retarding pressure chambers 107. Accordingly, the valve timing of the intake valve 9 is retarded, and finally, the valve timing of the intake valve 9 is fixed at the most retarded position. Then, the valve timing control is stopped (S150), and then, the routine ends. When the valve timing control is thus prohibited, the hydraulic pressure control for the variable valve operating mechanism 100 is stopped.

Thus, the valve timing control prohibition routine is executed. Therefore, if the hydraulic pressure Pre of the hydraulic fluid supplied to the variable valve operating mechanism 100 satisfies the preset prohibition control that the hydraulic pressure Pre is equal to or lower than the determination pressure α (the hydraulic pressure Pre≦the determination pressure α) when the engine operating state is in the reduced-cylinder operation region G, the valve timing control is prohibited by the process in step S150. Thus, in the case where the reduced-cylinder operation is performed, and accordingly, the precise hydraulic pressure control is required, when the hydraulic pressure Pre of the hydraulic fluid satisfies the preset prohibition condition, and therefore, the response of the variable valve operating mechanism 100 may be decreased, the valve timing control is prohibited. Accordingly, it is possible to reduce the possibility that the valve timing of the intake valve 9, which is variably controlled, becomes unstable during the reduced-cylinder operation, in the engine 1 in which the all-cylinder operation and the reduced-cylinder operation are performed.

If the valve timing control is immediately prohibited, and the operation of the variable valve operating mechanism 100 is stopped at the time point at which the hydraulic pressure Pre of the hydraulic fluid satisfies the preset prohibition condition, the movable portion of the variable valve operating mechanism 100 may be moved due to an external force such as the cam torque, and the valve timing may be changed. In this regard, in the above-described valve timing control prohibition routine, when the valve timing control is prohibited, the valve timing characteristic is fixed to a predetermined characteristic by the process in step S140, before the valve timing control is prohibited. Accordingly, it is possible to reduce the possibility that the valve timing of the intake valve 9 is changed when the valve timing control is prohibited.

When the operation of the variable valve operating mechanism 100 is stopped by prohibiting the valve timing control, the movable portion of the variable valve operating mechanism 100 is moved in a direction in which the cam torque acts. More specifically, the movable portion of the variable valve operating mechanism 100 is moved in the direction so that the valve timing is retarded. Accordingly, when the valve timing characteristic is fixed to the predetermined characteristic in step S140, the valve timing of the intake valve 9 is fixed at the most retarded position. Thus, the valve timing is fixed using the cam torque. Accordingly, it is possible to more easily fix the valve timing.

As described above, according to the embodiment, it is possible to obtain the following advantageous effects. (1) If the hydraulic pressure Pre of the hydraulic fluid supplied to the variable valve operating mechanism 100 satisfies the preset prohibition condition, more specifically, if the hydraulic pressure Pre is equal to or lower than the determination pressure α, and thus, it is determined that the response of the variable valve operating mechanism 100 may be decreased when the engine operating state is in the reduced-cylinder operation region G, the valve timing control is prohibited. Thus, in the case where the reduced-cylinder operation is performed, and thus, the precise hydraulic pressure control is required, when the response of the variable valve operating mechanism 100 may be decreased, the valve timing control is prohibited. Accordingly, it is possible to reduce the possibility that the valve timing of the intake valve 9, which is variably controlled, becomes unstable during the reduced-cylinder operation, in the engine 1 in which the all-cylinder operation and the reduced-cylinder operation are performed.

(2) When the valve timing control is prohibited, the valve timing control is prohibited after the valve timing characteristic of the intake valve 9 is fixed to the predetermined characteristic. Accordingly, it is possible to reduce the possibility that the valve timing of the intake valve 9 is changed when the valve timing control is prohibited.

(3) When the valve timing characteristic is fixed to the predetermined characteristic, the valve timing of the intake valve 9 is fixed at the most retarded position. Accordingly, it is possible to fix the valve timing using the cam torque, and thus, it is possible to more easily fix the valve timing.

(4) The determination pressure α is variably set so that the determination pressure α is increased as the hydraulic fluid temperature Tem of the hydraulic fluid increases. Therefore, it is possible to appropriately determine whether the response of the variable valve operating mechanism 100 may be decreased due to an increase in the temperature of the hydraulic fluid.

(5) The determination pressure α is variably set so that the determination pressure α is increased as the engine speed NE decreases. Accordingly, when the valve timing is likely to be made unstable by a decrease in the engine speed NE, it is possible to reduce the possibility that the valve timing is made even more unstable by a decrease in the response of the variable valve operating mechanism 100.

[Second embodiment] Next, a control apparatus for an internal combustion engine according to a second embodiment of the invention will be described with reference to FIG. 6 and FIG. 7.

In the first embodiment, if the hydraulic pressure Pre of the hydraulic fluid supplied to the variable valve operating mechanism 100 satisfies the preset prohibition condition when the engine operating state is in the reduced-cylinder operation region G, the valve timing control is prohibited. The second embodiment is basically the same as the first embodiment, except that, instead of executing the valve timing control prohibition routine, a reduced-cylinder operation prohibition routine described below is executed, and thus, the reduced-cylinder operation is prohibited when a similar prohibition condition is satisfied in the second embodiment. Thus, the control apparatus for an internal combustion engine according to the second embodiment will be described with a focus on the difference between the first embodiment and the second embodiment.

Figure 6:
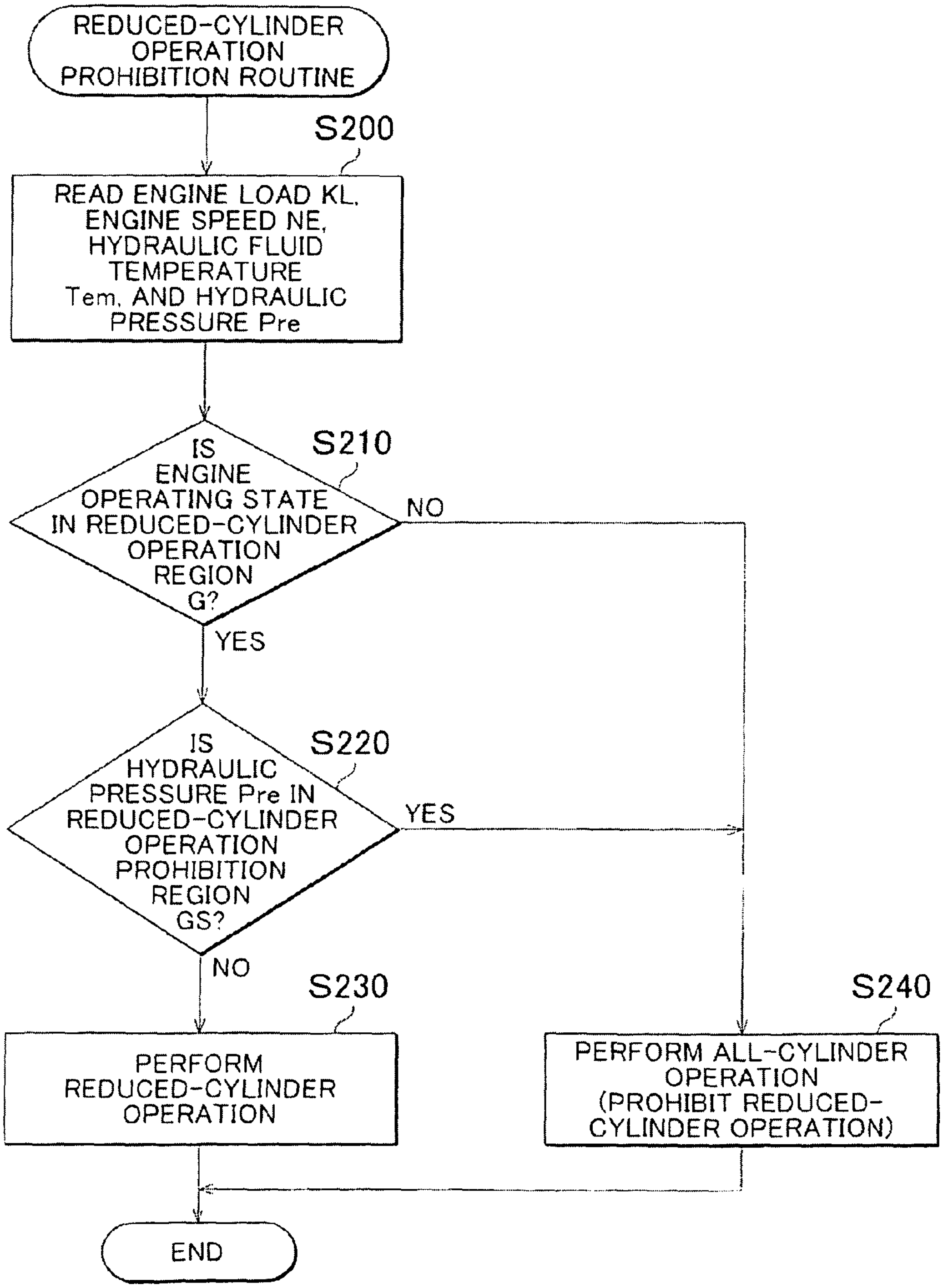
FIG. 6 is a flowchart showing steps of a reduced-cylinder operation prohibition routine according to a second embodiment.

FIG. 6 shows steps of the reduced-cylinder operation prohibition routine. The electronic control unit 26 repeatedly executes the routine at predetermined time intervals. When the routine is started, first, the engine load KL, the engine speed NE, the hydraulic fluid temperature Tem, and the hydraulic pressure Pre are read (S200).

Next, it is determined whether the current engine operating state is in the reduced-cylinder operation region G based on the engine load KL and the engine speed NE (S200). When it is determined that the engine operating state is not in the reduced-cylinder operation region G, that is, when it is determined that the engine operating state is in the all-cylinder operation region A (NO in step S210), the all-cylinder operation is performed (S240). Then, the routine ends.

When it is determined that the engine operating state is in the reduced-cylinder operation region G (YES in step S210), it is determined whether the current hydraulic pressure Pre is in a reduced-cylinder operation prohibition region GS (S220). When it is determined that the hydraulic pressure Pre is in the reduced-cylinder operation prohibition region GS, it is determined that the hydraulic pressure Pre satisfies a prohibition condition for prohibiting the reduced-cylinder operation.

Figure 7:
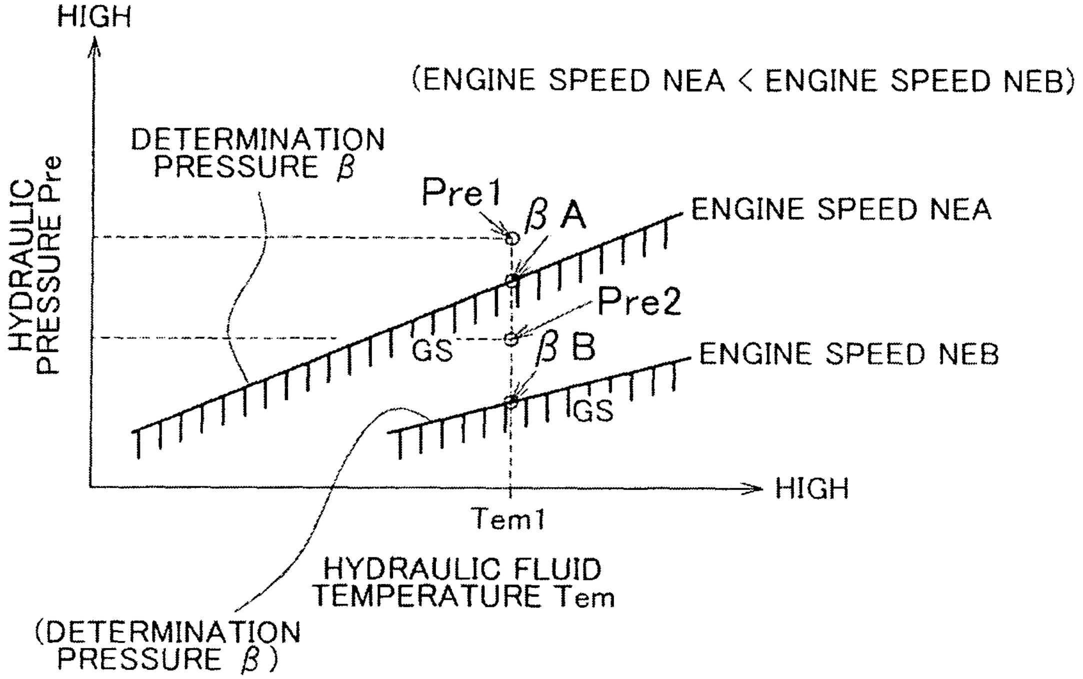
FIG. 7 is a conceptual diagram showing a manner in which a reduced-cylinder operation prohibition region is set according to the second embodiment.

FIG. 7 shows a manner in which the reduced-cylinder operation prohibition region GS is set. As shown in FIG. 7, when the hydraulic pressure Pre is equal to or lower than a predetermined pressure β, it is determined that the current hydraulic pressure Pre is in the reduced-cylinder operation prohibition region GS, and thus, it is determined that the response of the variable valve operating mechanism 100 may be decreased due to the decrease in the hydraulic pressure. The determination pressure β is variably set based on the hydraulic fluid temperature Tem and the engine speed NE. The reason why the determination pressure β is variably set is the same as the reason why the determination pressure α is set.

That is, as the temperature of the hydraulic fluid increases, the viscosity of the hydraulic fluid decreases. Therefore, the amount of the hydraulic fluid that leaks in the variable valve operating mechanism 100 increases. For example, the amount of the hydraulic fluid that leaks from the timing-advancing pressure chambers 106 and the timing-retarding pressure chambers 107 increases. Accordingly, when the leak amount increases, even if the pressure of the hydraulic fluid is high to some extent, the amount of the hydraulic fluid used to rotate the rotor 101 decreases, and as a result, the response of the variable valve operating mechanism 100 decreases. Thus, as shown in FIG. 7, the determination pressure β is variably set so that the determination pressure β is increased as the hydraulic fluid temperature Tem of the hydraulic fluid increases. Thus, when the hydraulic pressure Pre remains the same, as the response of the variable valve operating mechanism 100 is more likely to be decreased due to an increase in the temperature of the hydraulic fluid, the prohibition condition that the hydraulic pressure Pre is equal to or lower than the determination pressure β (the hydraulic pressure Pre≦the determination pressure β) is more likely to be satisfied. Thus, it is possible to appropriately determine whether the response of the variable valve operating mechanism 100 may be decreased due to an increase in the temperature of the hydraulic fluid.

As the engine speed NE decreases, the rotational speed of the intake camshaft 11 decreases, and the cycle of change of the cam torque increases. Therefore, as the engine speed NE decreases, the cam torque tends to change more distinctly, and the valve timing tends to be made more unstable. Accordingly, as shown in FIG. 7, the determination pressure β is variably set so that the determination pressure β is increased as the engine speed NE decreases. Thus, as the valve characteristics are more likely to be made unstable, the prohibition condition that the hydraulic pressure Pre is equal to or lower than the determination pressure β (the hydraulic pressure Pre≦the determination pressure β) is more likely to be satisfied. Accordingly, when the valve timing is likely to be made unstable by a decrease in the engine speed NE, it is possible to reduce the possibility that the valve timing is made even more unstable by a decrease in the response of the variable valve operating mechanism 100.

An example of a manner, in which it is determined whether the hydraulic pressure Pre is in the reduced-cylinder operation prohibition region GS, will be described with reference to FIG. 7. For example, when the current engine speed NE is the engine speed NEA (for example, approximately 1000 r/min), and the hydraulic fluid temperature Tem is the hydraulic fluid temperature Tem1, the determination pressure β is set to a determination pressure βA corresponding to the engine speed NEA and the hydraulic fluid temperature Tem1. When the current hydraulic pressure pre1 is higher than the determination pressure βA, it is determined that the hydraulic pressure Pre is not in the reduced-cylinder operation prohibition region GS. When the current hydraulic pressure Pre2 is equal to or lower than the determination pressure βA, it is determined that the hydraulic pressure Pre is in the reduced-cylinder operation prohibition region GS.

When the current engine speed NE is the engine speed NEB (for example, approximately 2000 r/min) that is higher than the engine speed NEA, and the hydraulic fluid temperature Tem is the hydraulic fluid temperature Tem1, the determination pressure β is set to a determination pressure βB corresponding to the engine speed NEB and the hydraulic fluid temperature Tem1. Also, as in the above-described manner, when the current hydraulic pressure Pre is higher than the determination pressure βB, it is determined that the hydraulic pressure Pre is not in the reduced-cylinder operation prohibition region GS. When it is determined that the current hydraulic pressure Pre is equal to or lower than the determination pressure βB, it is determined that the hydraulic pressure Pre is in the reduced-cylinder operation prohibition region GS.

When it is determined that the hydraulic pressure Pre is not in the reduced-cylinder operation prohibition region GS in step S220 (NO in step S220), it is determined that the valve timing is not made unstable, and thus, the reduced-cylinder operation is performed (S230). Then, the routine ends.

When it is determined that the hydraulic pressure Pre is in the reduced-cylinder operation prohibition region GS in step S220 (YES in step S220), it is determined that the valve timing may be made unstable. Therefore, even when the engine load KL and the engine speed NE are in the reduced-cylinder operation region G, the all-cylinder operation is performed (S240). Thus, the reduced-cylinder operation is substantially prohibited. Then, the routine ends.

Because the reduced-cylinder operation prohibition routine is executed, even when the engine operating state is in the reduced-cylinder operation region G, if the hydraulic pressure Pre of the hydraulic fluid supplied to the variable valve operating mechanism 100 satisfies the preset prohibition condition that the hydraulic pressure Pre is equal to or lower than the determination pressure β (the hydraulic pressure Pre≦the determination pressure β), priority is given to prohibition of the reduced-cylinder operation, and thus, the reduced-cylinder operation is prohibited by the process in step S240. Thus, when the hydraulic pressure Pre of the hydraulic fluid satisfies the preset prohibition condition, and therefore, the response of the variable valve operating mechanism 100 may be decreased, the reduced-cylinder operation, during which the precise hydraulic pressure control is required, is prohibited. Accordingly, it is possible to reduce the possibility that the valve timing of the intake valve 9, which is variably controlled, becomes unstable due to the reduced-cylinder operation, in the engine 1 in which the all-cylinder operation and the reduced-cylinder operation are performed.

As described above, according to the second embodiment, it is possible to obtain the advantageous effects. (1) If the hydraulic pressure Pre of the hydraulic fluid supplied to the variable valve operating mechanism 100 satisfies the preset prohibition condition (the hydraulic pressure Pre≦the determination pressure β), more specifically, the hydraulic pressure Pre is equal to or lower than the determination pressure β, and thus, it is determined that the response of the variable valve operating mechanism 100 may be decreased when the engine operating state is in the reduced-cylinder operation region G, the reduced-cylinder operation is prohibited. Accordingly, it is possible to reduce the possibility that the valve characteristics, which are variably controlled, become unstable due to the reduced-cylinder operation, in the multi-cylinder internal combustion engine in which the all-cylinder operation and the reduced-cylinder operation are performed.

(2) The determination pressure β is variably set so that the determination pressure β is increased as the hydraulic fluid temperature Tem of the hydraulic fluid increases. Therefore, it is possible to appropriately determine whether the response of the variable valve operating mechanism 100 may be decreased due to an increase in the temperature of the hydraulic fluid.

(3) The determination pressure β is variably set so that the determination pressure β is increased as the engine speed NE decreases. Accordingly, when the valve timing is likely to be made unstable by a decrease in the engine speed NE, it is possible to reduce the possibility that the valve timing is made even more unstable by a decrease in the response of the variable valve operating mechanism 100.

Modifications may be made to the above-described embodiments. In the above-described embodiments, the determination pressure α and the determination pressure β are variably set based on the hydraulic fluid temperature Tem and the engine speed NE. However, the determination pressure α and the determination pressure β may be variably set in a simpler manner. For example, the determination pressure α and the determination pressure β may be variably set based on the hydraulic fluid temperature Tem, or based on the engine speed NE. Further, the determination pressure α and the determination pressure β may be set to fixed values.

In the above-described embodiments, the hydraulic fluid temperature Tem is detected using the hydraulic fluid temperature sensor 36. However, the hydraulic fluid temperature Tem may be estimated based on, for example, the temperature of the coolant of the engine 1. In the above-described embodiments, the hydraulic pressure Pre, which indicates the pressure of the hydraulic fluid, is detected using the hydraulic pressure sensor 37. Because as the temperature of the hydraulic fluid increases, the pressure of the hydraulic fluid tends to decrease due to the decrease in the viscosity, the hydraulic pressure Pre may be estimated based on the hydraulic fluid temperature Tem. Also, because as the hydraulic fluid temperature Tem increases, the hydraulic pressure Pre decreases, a condition that the hydraulic fluid temperature Tem of the hydraulic fluid is equal to or higher than a preset determination temperature may be set as a condition for prohibiting the valve timing control, or a condition for prohibiting the reduced-cylinder operation. In this case as well, it is possible to determine whether the response of the variable valve operating mechanism 100 may be decreased due to a decrease in the pressure of the hydraulic fluid. In addition to directly detecting the hydraulic fluid temperature Tem using, for example, the hydraulic fluid temperature sensor 36, the hydraulic fluid temperature Tem may be estimated based on, for example, the engine operating state, the temperature of the coolant of the engine, or an elapsed time after the engine is started.

As in the above-described embodiments, when the oil pump 150 for the hydraulic fluid is driven by the crankshaft 7, as the engine speed NE decreases, the amount of the hydraulic fluid delivered by the oil pump 150 decreases, and the pressure of the hydraulic fluid decreases. Accordingly, the hydraulic pressure Pre may be estimated based on the engine speed NE. Also, because as the engine speed NE decreases, the hydraulic pressure Pre decreases, a condition that the engine speed NE is equal to or lower than a preset speed is set as a condition for prohibiting the valve timing control or a condition for prohibiting the reduced-cylinder operation. In this case as well, it is possible to determine whether the response of the variable valve operating mechanism 100 may be decreased due to a decrease in the pressure of the hydraulic fluid.

In the above-described first embodiment, when the valve timing characteristic is fixed to the predetermined characteristic by the process in step S140 shown in FIG. 4, the valve timing of the intake valve 9 is fixed at the most retarded position. In addition, the valve timing characteristic may be fixed to a given characteristic in a range in which the valve timing characteristic is variable In this case, the movable portion of the variable valve operating mechanism may be fixed using, for example, a locking mechanism. For example, a locking pin that restricts the rotation of the rotor 101 relative to the housing 103 may be provided. In this case, when the valve timing characteristic is fixed to a predetermined characteristic, the rotation of the rotor 101 may be restricted using the locking pin. When the valve timing of the intake valve 9 is fixed at the most retarded position, the valve timing may be reliably fixed by regulating the rotation of the rotor 101 using, for example, the locking mechanism.

In the above-described embodiments, the invention is applied to the control apparatus that executes the feedback control of the variable valve operating mechanism 100. However, the invention may be applied to a control apparatus that executes an open-loop control.

The number of the deactivated cylinders during the reduced-cylinder operation may be changed according to, for example, the engine operating state. For example, as the speed and the load of the engine 1 decrease, the number of the deactivated cylinders may be increased, in other words, the number of the operating cylinders may be decreased.

In the above-described embodiments, the valve characteristics of the intake valve 9 are changed by the variable valve operating mechanism 100. However, the invention may also be applied to the case where the valve characteristics of the exhaust valve 10 are changed using a similar mechanism, or the case where the valve characteristics of the intake valve 9 and the exhaust valve 10 are changed using the similar mechanism.

In most cases, the reduced-cylinder operation is performed when the engine operating state is in a low-load region and thus, the combustion of the air-fuel mixture is likely to deteriorate. Therefore, in the first embodiment, when the valve timing characteristic is fixed to the predetermined characteristic, the valve timing characteristic may be fixed so that the combustion of the air-fuel mixture is stabilized. For example, when the valve timing of the intake valve 9 is changed using the variable valve operating mechanism 100, the valve timing of the intake valve 9 may be fixed at the most retarded position, as described above. Also, when the valve timing of the exhaust valve 10 is changed using a mechanism similar to the variable valve operating mechanism 100, the valve timing of the exhaust valve 10 may be fixed at the most advanced position. By fixing the valve timing of the intake valve 9 at the most retarded position, and fixing the valve timing of the exhaust valve 10 at the most advanced position, it is possible to minimize valve overlap. Thus, it is possible to reduce the amount of exhaust gas recirculated by internal EGR (internal EGR gas) when the valve characteristics are fixed. Therefore, it is possible suppress the deterioration of the combustion when the valve characteristics are fixed to predetermined characteristics.

In the case where the valve timing of the exhaust valve 10 is changed using a mechanism similar to the variable valve operating mechanism 100, a spool may be urged by a spring so that the hydraulic pressure is supplied to the timing-advancing pressure chambers when the supply of electric power to the solenoid of the hydraulic pressure control valve is stopped. With this configuration, when the hydraulic pressure control for the variable valve operating mechanism is stopped, the valve timing of the exhaust valve 10 is fixed at the most advanced position. The valve timing characteristic of the exhaust valve 10 may be fixed to a given characteristic in a range in which the valve timing characteristic of the exhaust valve 10 is variable. In this case, the movable portion of the variable valve operating mechanism for the exhaust valve 10 may be fixed using, for example, a locking mechanism.

The invention is not limited to the variable valve operating mechanism 100 in the above-described embodiment. The invention may also be applied to a variable valve operating mechanism with the other configuration that changes the valve characteristics (for example, the opening timing, the closing timing, the valve-open period, and the maximum lift amount) of the engine valve, for example, the intake valve 9 and/or the exhaust valve 10. That is, the invention may be applied to any variable valve operating mechanism, as long as the degree of change in the valve characteristics with respect to a change in the pressure of the hydraulic fluid is changed according to a change in the cam torque.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A control apparatus for an internal combustion engine, which is employed for a multi-cylinder internal combustion engine that includes a camshaft provided to press engine valves against reaction force of valve springs;

a hydraulically-actuated variable valve operating mechanism which changes a valve characteristic of the engine valves by changing a rotational phase of the camshaft relative to a crankshaft; and a valve stop mechanism which stops opening and closing of the engine valve(s) in a part of cylinders, the control apparatus comprising:

a control unit that executes a variable valve control that makes an actual value of the valve characteristic match a target value of the valve characteristic by executing a hydraulic pressure control for the variable valve operating mechanism, and the control unit operates the valve stop mechanism so that a reduced-cylinder operation is performed when an engine operating state is in a preset reduced-cylinder operation region, the control unit having a preset hydraulic determination pressure stored therein; and a hydraulic pressure sensor that detects a pressure of the hydraulic fluid supplied to the variable valve operating mechanism, the hydraulic pressure sensor in communication with the control unit;

wherein the control unit compares the hydraulic pressure detected by the hydraulic pressure sensor to the preset hydraulic determination pressure and the control unit prohibits the variable valve control if the detected hydraulic pressure is equal to or lower than the preset hydraulic determination pressure only when the engine operating state is in the reduced-cylinder operation region.

2. The control apparatus for an internal combustion engine according to claim 1, wherein when the variable valve control is prohibited, the variable valve control is prohibited after the valve characteristic is fixed to a predetermined characteristic.

3. The control apparatus for an internal combustion engine according to claim 2, wherein the engine valves are intake valves, and when the valve characteristic is fixed to the predetermined characteristic, a valve timing of each of the intake valves is fixed at a most retarded position.

4. The control apparatus for an internal combustion engine according to claim 1, wherein the preset hydraulic determination pressure is variably set so that the preset hydraulic determination pressure is increased as a temperature of the hydraulic fluid increases.

5. The control apparatus for an internal combustion engine according to claim 1, wherein the preset hydraulic determination pressure is variably set so that the preset hydraulic determination pressure is increased as an engine speed decreases.

* * * * *